June 1, 1954   H. W. MARANO   2,679,723
STAPLE FORMING MACHINE
Filed March 23, 1951   6 Sheets-Sheet 6

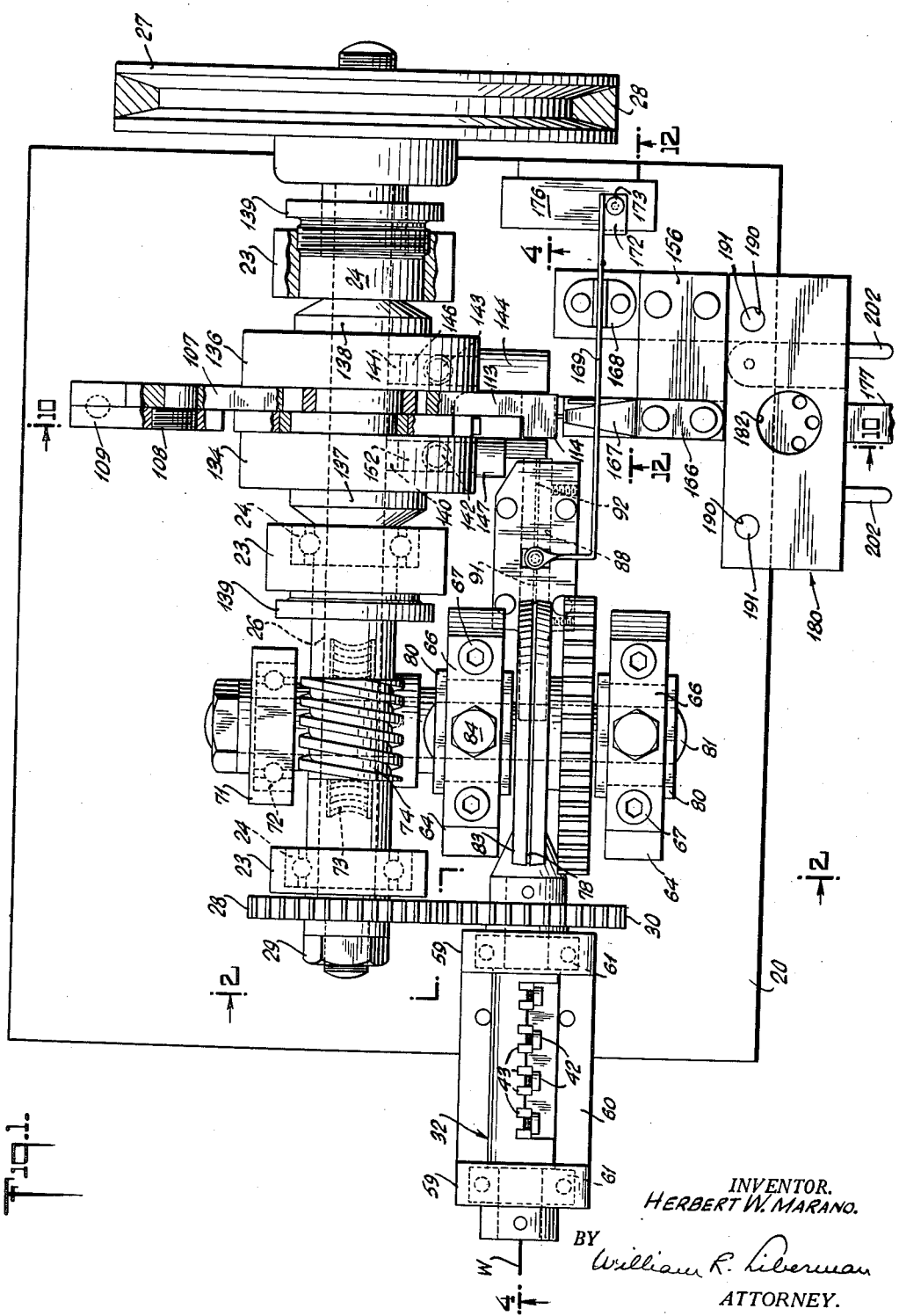

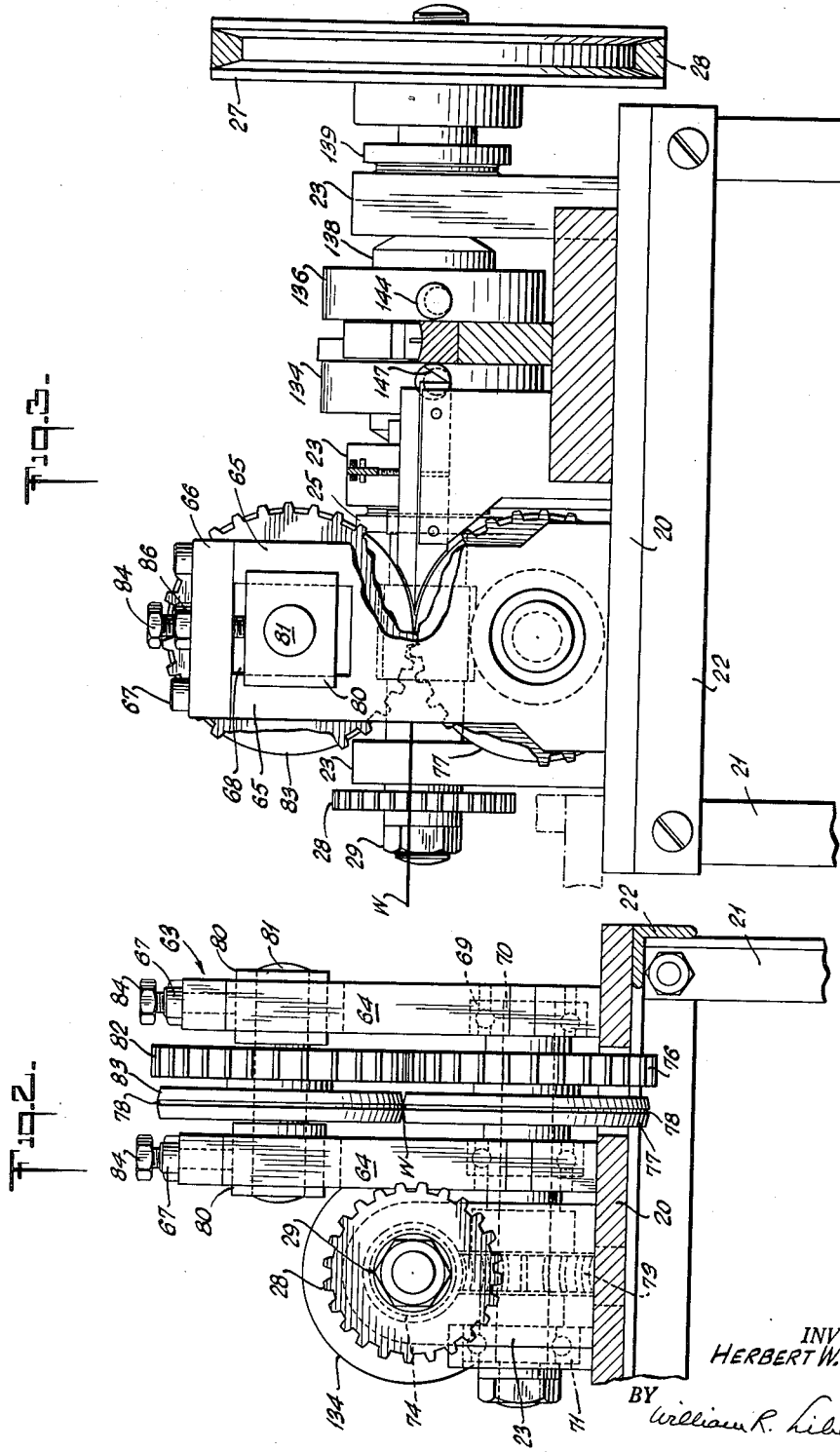

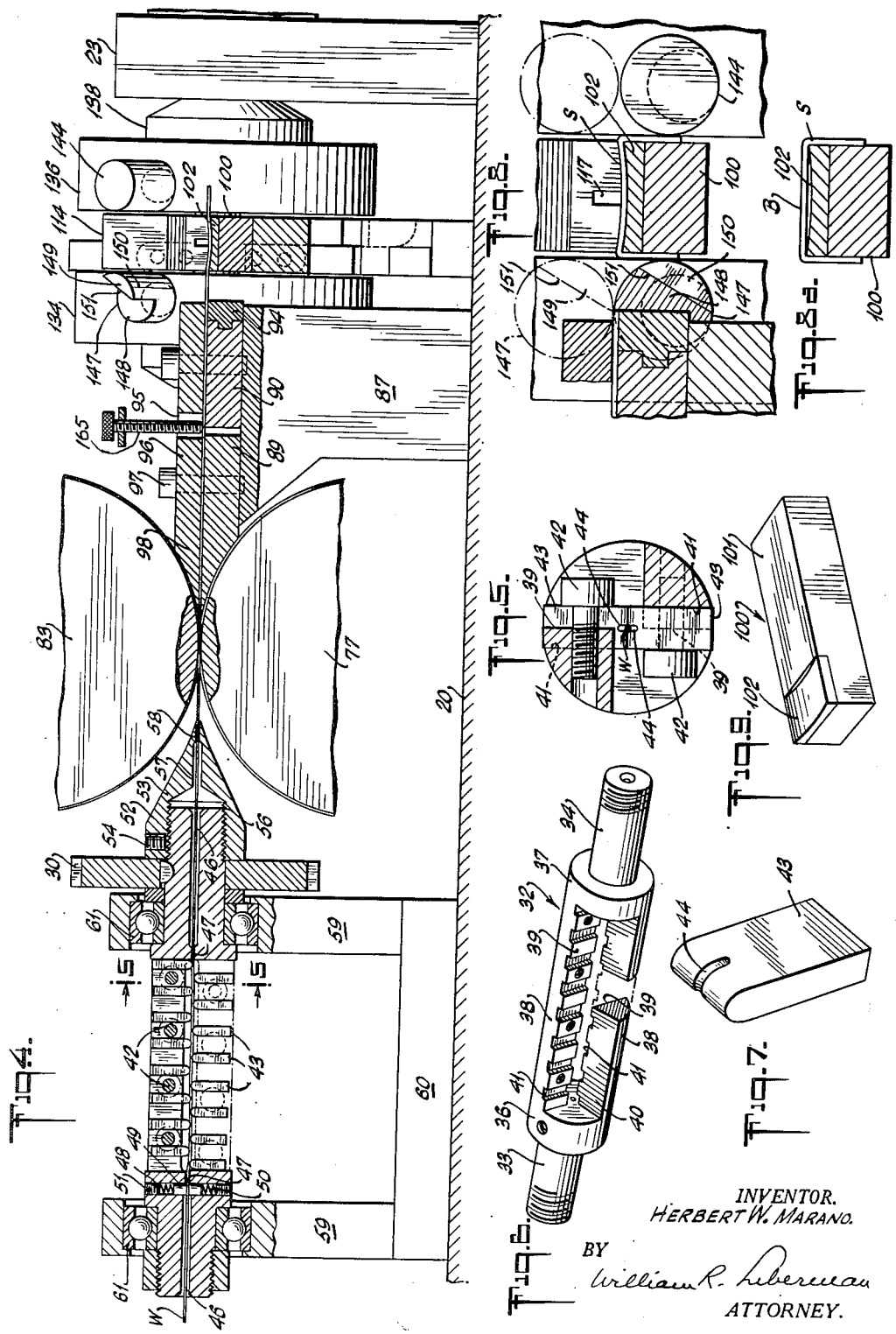

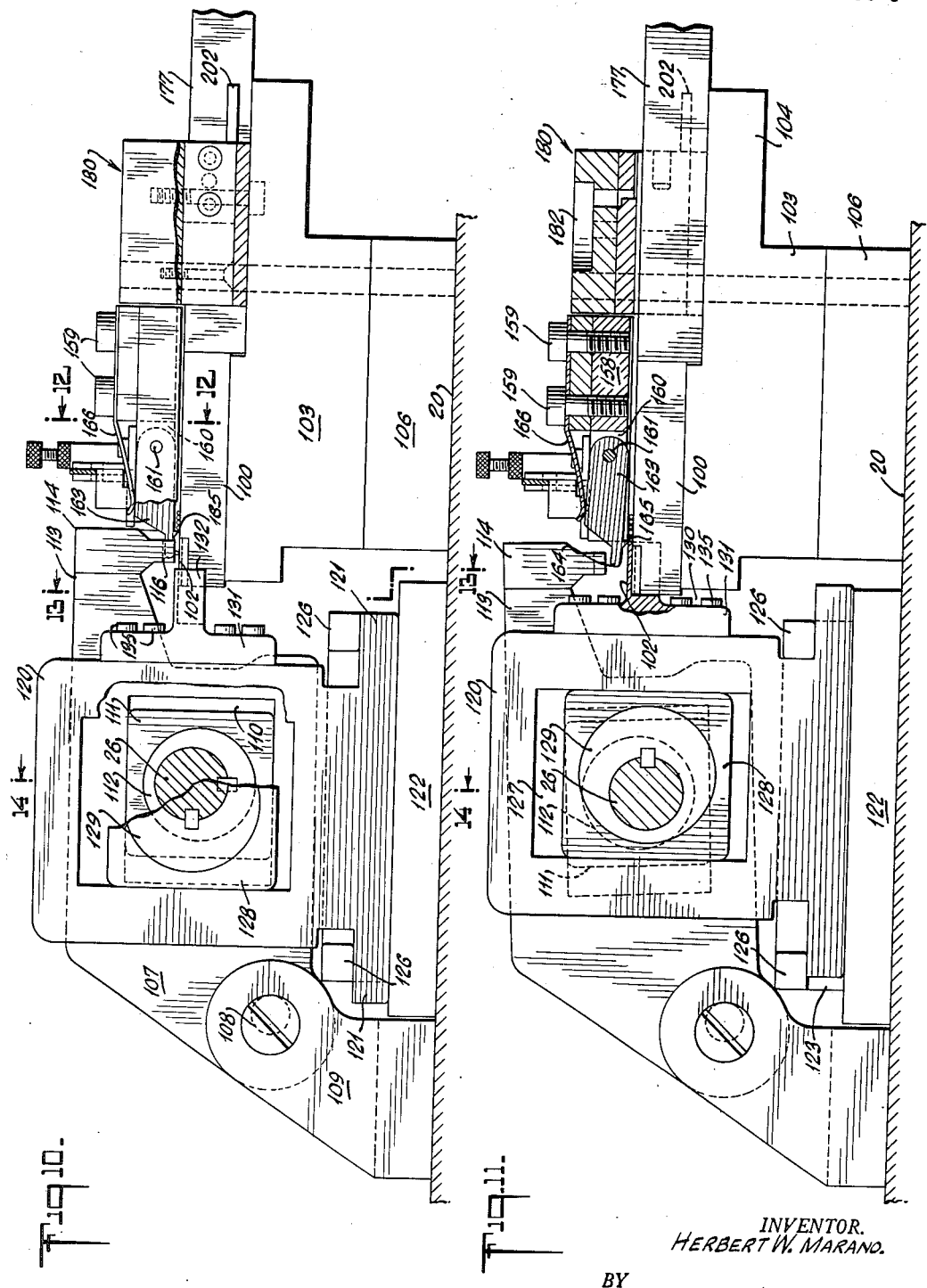

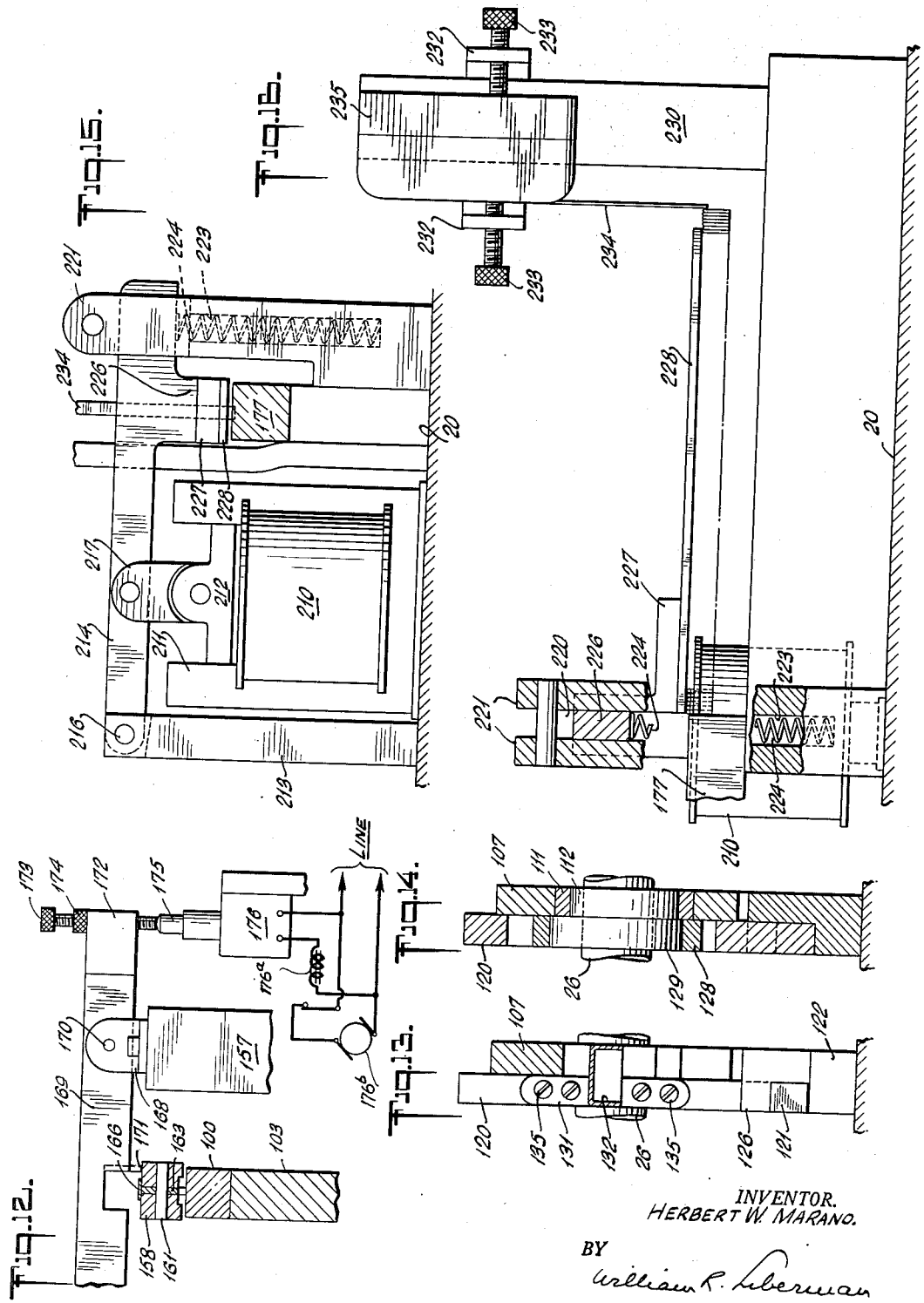

INVENTOR.
HERBERT W. MARANO.
BY
William R. Lieberman
ATTORNEY.

Patented June 1, 1954

2,679,723

UNITED STATES PATENT OFFICE 2,679,723

STAPLE FORMING MACHINE

Herbert W. Marano, Brooklyn, N. Y., assignor to Wilson Jones Company, Chicago, Ill., a corporation of Massachusetts Application March 23, 1951, Serial No. 217,247

13 Claims. (Cl. 59—76)

The present invention relates to an improved machine for the fabrication of articles from strip material and it relates more particularly to an improved machine for the production of wire staples.

The machines conventionally employed heretofore for the production of wire staples usually consist of a reciprocating die member which cooperates with a mandrel to cut and form into staples wire which is continuously fed to the mandrel. A mechanism is provided therewith to advance the staples to a device for applying a cohering substance, and the resulting strip of staples is then cut into predetermined lengths. These machines are generally expensive, complex, cumbersome and slow. They are characterized by their high maintenance and power consumption costs, frequent shut-downs due to jamming and other causes, and top production speeds not exceeding a few hundred staples per minute. Furthermore, the staples produced on these machines are of inferior quality, the wire forming the staples being distorted and flattened, and the formed staples lacking uniformity as well as possessing other undesirable properties.

It is, therefore, a principal object of the present invention to provide an improved machine for the fabrication of shaped articles from strip material.

Another object of the present invention is to provide an improved machine for the fabrication of wire staples.

Still another object of the present invention is to provide an improved machine for the fabrication of wire staples, which machine is characterized by its compactness, simplicity and ruggedness.

A further object of the present invention is to provide an improved high speed machine for the fabrication of wire staples, which machine requires little maintenance or attendance and consumes a minimum of power.

Still a further object of the present invention is to provide an improved simple, compact and efficient high speed wire staple fabricating machine which produces staple strips of uniform, predetermined lengths.

Another object of the present invention is to provide an improved simple, compact and efficient machine for fabricating wire staples which are of superior quality.

Still another object of the present invention is to provide an improved machine for the production of wire staples which machine is simply adjustable to handle wire of wide tolerances with a minimum of distortion to the wire or the resulting staples shaped therefrom.

The above and further objects of the present invention will become apparent from a reading of the following description in conjunction with the accompanying drawings, wherein Figure 1 is a top plan view of a preferred embodiment of the present invention with a portion of the machine omitted for convenience of illustration;

Figure 2 is a sectional view along the line 2—2 of Figure 1;

Figure 3 is a front elevational view of a part of the machine with portions broken away;

Figure 4 is a sectional view along line 4—4 of Figure 1;

Figure 5 is a sectional view along line 5—5 of Figure 4;

Figure 6 is a detailed perspective view of a portion of the straightening and burnishing mechanism of the present invention;

Figure 7 is a perspective view of the polishing and straightening guide element employed in the straightening and burnishing mechanism;

Figure 8 is a transverse sectional detailed view of a portion of the machine illustrating the operation of the wire cutting and shaping mechanism;

Figure 8a is a transverse sectional view of the mandrel employed in the present machine, illustrated as supporting a finished staple;

Figure 9 is a perspective view of the shaping mandrel;

Figure 10 is a sectional view along line 10—10 of Figure 1 with parts broken away for convenience of illustration;

Figure 11 is a view similar to Figure 10, with parts shown in section and broken away to illustrate further details of the present machine;

Figure 12 is a sectional view along line 12—12 of Figure 10;

Figure 13 is a sectional view along line 13—13 of Figure 10;

Figure 14 is a sectional view along line 14—14 of Figure 10;

Figure 15 is a front detail elevational view of the metering and staple strip cut-off mechanism illustrated partially in section and partially broken away;

Figure 16 is a side elevational view thereof, also shown partially in section and partially broken away;

Figure 17:
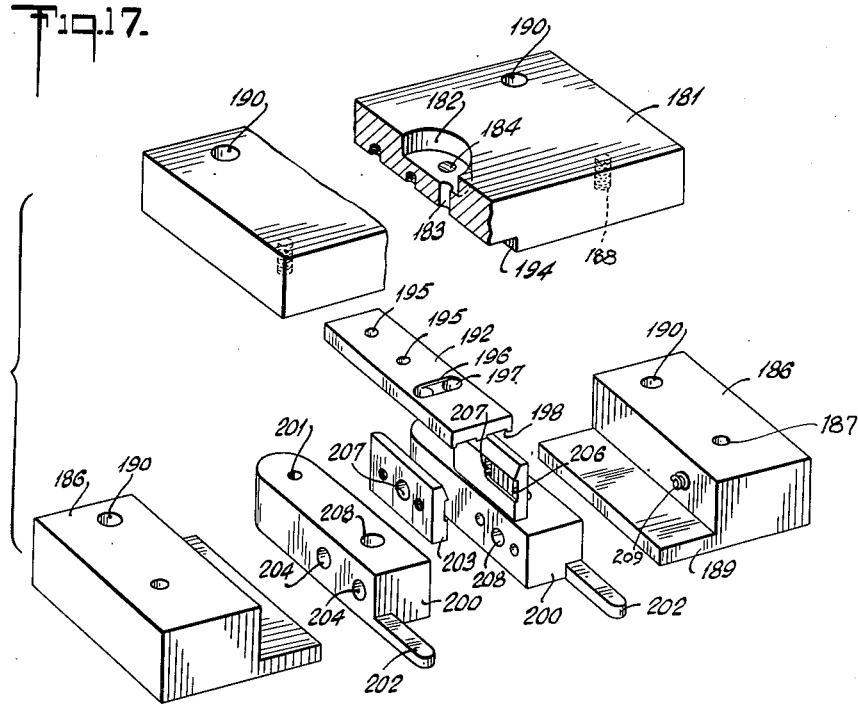
Figure 17 is a perspective view of the disassembled adhesive applying device illustrating the components thereof in detail.
Figure 18:
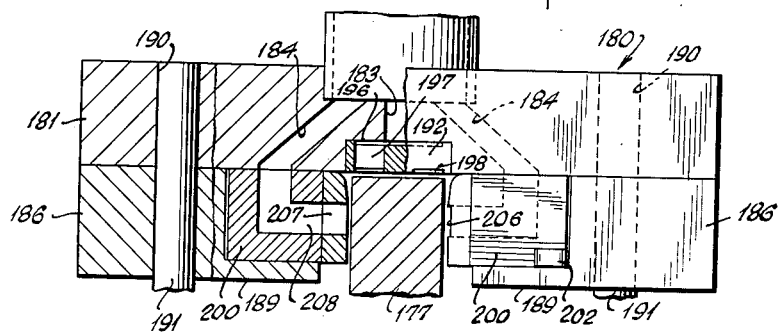
Figure 18 is a front elevational view of the assembly thereof partially in section and partially broken away.

In one of its aspects, the present invention contemplates a cut-off block, a mandrel spaced from the cut-off block and a tool element driven in a circular path passing between said cut-off block and said mandrel, said tool element having a cutting edge periodically passing in engagement with said cut-off block and a shaping face periodically passing in confronting engagement with one side of said mandrel. A second tool element may be provided which is likewise driven in a circular path which periodically passes in confronting engagement with the other side of said mandrel. The wire is continuously fed over said cut-off block and said mandrel and across said intervening space by a pair of tangent feed rolls which are driven by the main shaft. A special feature of the invention resides in the provision of semicircular peripheral grooves in the feed rolls which are tangent to each other and engage the wire therein, thereby minimizing the flattening of the wire. The wire is drawn from a suitable reel through a rotating cleaning, burnishing and straightening device which is driven by the main shaft.

Other structural features of the present invention reside in the pad mechanism and pusher mechanism. A reciprocating pad which is actuated by the main drive shaft is provided, and periodically engages the wire between its lower surface and the confronting surface of the mandrel substantially concurrently with the engagement of the mandrel by the rotating tool elements. A pusher element, likewise actuated by the main drive shaft, slides along the mandrel and is thereon reciprocated, engaging the staple immediately following its formation and its release by the pad element and pushing the staple out of the path of the pad and the tool elements. The advance of the staple advances the stack of staples ahead of it along a guide rail and into engagement with a cohering substance applicator where the staples are formed into a continuous strip. The strip of staples is then cut into predetermined lengths by an improved metering and severing mechanism. Advancing beyond the terminus of the guide rail, the strip of staples is self-supporting in cantilever fashion and upon extending a predetermined distance from the guide rail terminus, it bears against an arm which closes a normally open micro-switch. The closing of the switch results in the energizing of a solenoid which attracts an armature and actuates a cutting element cooperating with the terminus of the guide rail to sever the projecting portion of the staple strip. The severed strip is permitted to fall, thus disengaging the switch arm and allowing the switch to return to open position.

A novel and improved arrangement is provided to prevent or minimize any damage to the machine due to any jamming of the staples or wire. Thus, the wire in its travel from the feed rolls to the cut-off block is confined to a predetermined path. An opening is provided along this path which would permit the buckling of the wire in the event of any impediment to its advance. A finger extends into the opening and actuates an electric switch when it is borne upon by the wire as a result of the buckling thereof. The switch is connected in a circuit with the motor driving the main drive shaft so that upon actuation of the switch, the motor is de-energized thereby interrupting the rotation of the shaft and stopping the machine. The switch may likewise be actuated to stop the machine by a finger resting upon a member overlaying the path of the stack of staples at the feed end of the formed staples. An impediment to the advance of the staples results in a piling up of the staples under the overlaying member causing the member to rise, lifting the finger and actuating the switch to stop the machine.

Referring now to the drawings and more particularly to Figures 1–7 thereof, the numeral 20 generally designates a horizontal base plate suitably supported at any desired level by a framework including legs 21 and cross members 22, illustrated as formed of angle irons. A plurality of laterally spaced upright brackets 23 rotatably support, by means of ball bearings 24, a main drive shaft 26 which actuates the various components and mechanisms constituting the present apparatus. Secured to one end of the drive shaft 26 is a pulley 27 which is engaged by a belt 26, which, in turn, is driven by an electric motor or other suitable drive means, not shown. Keyed to the opposite end of the drive shaft 26 is a gear 28 which is retained by a nut 29 engaging the threaded end of the drive shaft 26. The gear 28 engages a similar gear 30 which drives a wire cleaning, burnishing and straightening mechanism.

The wire cleaning, burnishing and straightening mechanism includes a rotatable spindle 32 provided with a pair of axially separated trunnions 33 and 34, each of which has an enlarged boss portion 36 and 37. Extending between and supported by the bosses 36 and 37 are diagonally opposed guide mounting bars 38 of substantially sector shaped cross section and having corresponding substantially radial parallel surfaces 39 as well as corresponding parallel surfaces 40. Formed in each of the surfaces 39 are the axially spaced transverse grooves 41 of rectangular cross section. The grooves 41 formed in the surfaces 39 are axially spaced between the grooves 41 formed in the other of the surfaces 39 and the widths of the grooves 41 are less than the distance between their adjacent edges. Disposed in each of the grooves 41 and secured therein by locking screws 42 are guide members 43, the locking screws 42 engaging corresponding tapped holes in the bars 38 between alternate pairs of grooves 41. The guide members 43 are slab shaped and formed of relatively hard material. The upper faces of the guide members are rounded off and have transverse arcuate grooves 44 of arcuate cross section formed therein. The members 43 are so positioned in the grooves 41 that the guide grooves 44 project radially beyond the axis of the spindle 32 by distances which decrease as we advance from the feed end of the spindle as defined by the trunnion 33 to the discharge end as defined by the trunnion 34. Thus, a wire passing through the spindle undulates at decreasing amplitudes as it progresses from the feed end to the discharge end. The trunnions 33 and 34 have axial bores 46 having constricted portions 47 formed therein and are threaded at their outer ends. Furthermore, the boss 36 has a pair of opposed tapped radial bores 48 formed therein, in which there are positioned wiper elements 49 formed of felt or other suitable material, compression springs 50 urging the wiper elements into the bore 46 and set screws 51 bearing against the compression springs 50.

A discharge nozzle 52 having a conical tip 53 has a tapped axial bore 56 which engages the threaded portion of the trunnion 34 and is locked in place by a set screw 54 engaging a tapped radial hole formed in the wall of the discharge nozzle 52 and bearing against the trunnion 34. Following the bore 56 are the communicating progressively smaller axial bores 57 and 58, the bore 58 passing through the apex of the conical tip 53. The bores 56 and 57 and 57 and 58 are connected by tapered shoulders. The gear 30 is keyed to the shaft 34 immediately anterior to the discharge nozzle 52.

The spindle 32 is rotatably supported between a pair of upright brackets 59 mounted on a cross piece 60, which, in turn, is secured to the base plate 20. The unthreaded portions of the trunnions 33 and 34 are engaged by ball bearings 61 which are disposed in the brackets 59.

Following the wire cleaning, burnishing and straightening mechanism is a wire advancing and feeding mechanism 63 which is best illustrated in Figures 1–4 of the drawings. The wire feeding mechanism includes a pair of transversely spaced upright brackets 64 mounted on the base plate 20 and each provided with a pair of spaced upright legs 65. Each pair of legs 65 is bridged by a bar member 66 which is secured to the legs by suitable screws 67 and define rectangular apertures 68.

The lower part of the brackets 64 are provided with circular openings which receive ball bearings 69, which, in turn, rotatably engage a shaft 70. The shaft 70 projects beyond the bracket 64 and the main drive shaft 26 and is disposed below and transverse to said main drive shaft 26. The projecting end of the shaft 70 is rotatably supported in an upright bracket 71 by means of ball bearings 72 mounted in said bracket 71. A gear 73 is suitably fixed to the shaft 70 and engages a worm 74 which is supported by and keyed to the main drive shaft 26.

Mounted on and keyed to the shaft 70 and between the brackets 64 are a spur gear 76 and a drawing or feed roll 77. The feed roll 77 has a groove 78 of semi-circular cross section circumferentially formed along the center of the peripheral wall of the feed roll 77. Furthermore, the peripheral wall of the feed roll is tapered slightly upwardly toward the groove 78. A pair of bushings 80 are provided with grooves of rectangular cross section in their side walls which grooves engage the legs 65 permitting the vertical sliding movement of the bushings 80 in the apertures 68 and suitably retain the bushing. A shaft 81 is rotatably supported by and between the bushings 80 and supports and has keyed thereto a gear 82 and a feed roll 83 of the same shape and dimensions as the gear 76 and feed roll 77 respectively. The gear 82 engages the gear 76 and the feed roll 83 cooperates with and is tangent to the feed roll 77 along the grooves 78. A hex-headed screw engages a corresponding tapped vertical bore in each of the cross bars 66 and has its lower end bearing against the respective bushing 80. By adjusting the screws 84, the pressure between the feed rolls 77 and 83 may be adjusted and these may be set by suitable lock nuts 86 provided in each of the adjusting screws 84. It should be noted that the discharge nozzle 32 mounted on the spindle 52 is directed toward the grooves 78 at the bite of the feed rolls 77 and 83.

The feed rolls 77 and 83 are followed by a wire guide and cutting block which are mounted in the upper face of a support 87, the upper portion of which projects rearwardly toward the feed rolls. A longitudinal rectangular groove 88 is formed in the top face of the support 87 and has disposed therein a wire guide 89 and a wire guide and cut-off block 90. The guide 89 has its rear portion projecting rearwardly of the support 87, its top face being along the tangent to the feed rolls 77 and 83 at their bite and its lower rear face being shaped to conform to the confronting surface of the feed roll 77. A guide groove 91 is formed on the top face of the guide 89 along the tangent to the feed rolls at their bite. Also disposed in the groove 88 and projecting slightly beyond its forward edge is the guide and cutting block 90, having a guide groove 92 formed in its top wall in alignment with the guide groove 91. The forward end of the cutting block 90 is provided with an insert or tip 94 formed of a hard material such as cemented tungsten carbide, the upper face of the tip 94 being at the level of the base of the groove 92 and its front face projecting beyond the support 87. The guide 89 and the block 90 are fixed in position by a plate 96 which is urged against the guide 89 and block 90 by means of screws 97 which pass through holes in the plate 96 and engage corresponding tapped bores in the support 87 in either side of the groove 88. The plate 96 is provided with a rearwardly projecting finger 98 which overlays the rearwardly projecting portion of the guide 89 and has its upper surface shaped to conform to the confronting surface of the feed roll 83. It should be noted that the rear of the guide 89 and the finger 98 extend almost into the bite between the feed rolls 77 and 83. Furthermore, an aperture or opening 95 is formed in the plate 96 which provides communication with the wire guide grooves 91 and 92 and permits the upward buckling of wire traversing the groove and subjected to a longitudinal compressive force.

The staple forming mechanism includes a mandrel 100 formed of a rectangular block 101 having an insert or tip 102 at its forward top face. The tip 102 is formed of a hard material such as cemented tungsten carbide and has a top working surface of concave cylindrical shape. The mandrel 100 is suitably mounted on the elevated portion of a support 103 which is provided with a rearwardly extending shelf 104 and is fixed to a base member 106. Furthermore, the mandrel 100 is so disposed that the tip 102 is longitudinally spaced from and on the level of the forward upper edge of the cutting block 90 and the mandrel extends laterally relative to the advance of the wire.

In order to periodically clamp successive strips of wire to the mandrel 100 during the forming of the staple, there is provided a clamping mechanism consisting of a yoke 107 swingably pivoted to an upright bracket 109 by means of a pin 108 which is supported by means of eccentric shank to permit adjustment thereof. A rectangular aperture 110 formed in the yoke 107 registers with the main shaft 26 and engages a bushing 111 which is limited to a horizontal sliding motion in the aperture 110. Rotatably engaged by the bushing 111 is a circular cam 112 which is eccentrically keyed to the main drive shaft 26 whereby rotation of the drive shaft 26 imparts a reciprocating motion to the yoke 107 about the pin 108. Furthermore, the yoke 107 is provided with an arm 113 forwardly projecting from its upper end and having secured to its front face a clamping member or pad 114. The pad 114 is provided wtih bottom portion 115 of reduced cross section joined to the top portion by a trapezoidal intermedial portion. The bottom face of the pad 114 is of convex cylinder shape conforming with and confronting the corresponding face of the tip 102 of the mandrel 100. Reciprocation of the yoke 107 as aforesaid results in the periodic movement of the pad 114 between the depressed wire engaging position and the retracted position as illustrated in Figures 10 and 11 of the drawings respectively. It should be noted that the width of the pad 114 is uniformly equal to the width of the mandrel 100, whereas the width of the yoke 107, bushing 111 and cam 112 are substantially half this width. Moreover, a groove 117 is formed in the bottom face of the pad 114 and extends centrally thereof in a direction parallel to the longitudinal axis of the mandrel 100.

A second yoke member 120 is provided in order to periodically effect the advance of the formed staples along the mandrel 100 toward subsequent operations. The yoke 120 has projecting from its front and rear bottom walls a pair of oppositely disposed arms 121 of rectangular cross-section and has its bottom face slidably resting upon a base member 122. Projecting vertically from each end of the base member 122 are uprights 123 having laterally extending lugs 126. The grooves defined by the base 122, uprights 123 and lugs 126 engage the arms 121, thereby providing a track and guide for the yoke 120 which permits and limits the movement of the yoke 120 to a horizontal transverse direction toward and away from the mandrel 100.

A rectangular aperture 127 is formed in the yoke 120 and slidably engages between its side walls a bushing 128 having a square perimeter and limits the bushing to vertical movement relative to the aperture 127. A circular cam 129 engages the bushing 128 and is eccentrically mounted and keyed to the drive shaft 26. Thus, rotation of the shaft 26 imparts a horizontal reciprocating motion to the yoke 120. The angular separation of the cams 112 and 129 on the shaft 26 are approximately 90°, as will be hereinafter more fully set forth. It should be noted that the confronting faces of the yokes 107 and 120 abut each other and that their aggregate thickness is about the width of the mandrel 100.

A pusher member 130 having a base portion 131 is mounted on the front wall of the yoke 120 by means of suitable screws 135 passing through holes in the base member 131 into correspondingly tapped holes in the wall of the yoke 120. Projecting from the base portion 131 is a channel shaped pusher element 132 which slidably engages the forward upper portion of the mandrel 100. The transverse cross-section of the pusher element 132 is substantially the shape of the finished staple, the wall thickness thereof being approximately equal to the staple wire diameter. The depth of the reciprocating stroke of the pusher element 132 as well as the pad 114 will be hereinafter set forth.

Cooperating with the cutting block 90 and the mandrel 100 is the wire cutting and staple shaping mechanism which includes a pair of cylindrical tool holders 134 and 136 which are disposed on and keyed to the drive shaft 26 on opposite sides of the yoke members 107 and 120. The holder 134 bears against the face of a spacer 137 fixed on the shaft 26 whereas the holder 136 bears against the face of a spacer 138 mounted also on the said shaft. Furthermore, the outside faces of the spacers 137 and 138 bear against the corresponding bearings 124 which are urged against them by threaded thrust collars 139 which engage tapped apertures in the brackets 23.

Each of the tool holders 134 and 136 is provided with a radial bore 140 and 141 respectively, which have communicating therewith and normal thereto tapped holes 142 and 143 which extend through the peripheral faces of the holders 134 and 136. A cylindrical shaping element 144 has an eccentric shank 146 registering with the bore 141 and locked in a predetermined position by a set screw engaging the tapped bore 143 and bearing against the shank 146. A second shaping and cutting member 147 is provided with a cylindrical boss 148 having a projecting, shaping and cutting element 149, having a cylindrical shaping surface 150 confronting the mandrel 100 and a planar face 151 extending between the edges of the shaping surface 150 and confronting the cut-off block 90. The lower line of intersection between the planar face 151 and the cylindrical shaping surface 150 defines a cutting edge extending axially of the element 149 and rotating in a plane skirting the cutting edge of the block 90. Furthermore, the planar surface 151 extends upwardly and away from the block 90 to permit the continuous advance of the wire after the cutting thereof, as will be more fully set forth. A shank 152 extends axially of the boss 148 and is eccentric thereto and registers with the bore 140 where it is adjustably fixed by a set screw which engages the tapped hole 142 and bears against said shank.

A mechanism is provided to guide the formed staples along and from the mandrel 100 and to automatically halt the machine upon the jamming thereof in order to prevent an unnecessary damage to the components thereof. This mechanism includes a resilient plate 156 supported at one end thereof by an upright block 157 and having mounted on the bottom face of its other end a block 158 by means of screws 159 passing through holes in the plate 156 and engaging corresponding tapped bores in the blocks 158. A vertical longitudinal slot 160 is formed in the block 158 and has registering therewith a latch member 163 which is pivoted at one end thereof between the walls of the slot 160 by means of a pin 161. Projecting forwardly of the latch member 163 is a finger 164 which is aligned with groove 117 in the pad 114 and registers therewith when the pad 114 is in depressed position. Furthermore, immediately anterior to the finger 164 is a depending projection or detent 165 having a front cam surface extending upwardly and forwardly. A leaf spring 166 is mounted upon the free end of the plate 156 by means of the screws 159 and has a projecting finger portion 167 bearing against the upper front edge of the latch member 163 urging it downwardly whereby the detent 165 normally bears against the upper surface of the mandrel 100 anterior to the tip or insert 102.

A pair of brackets 168 are mounted upon the upright block 157 and pivotally support between them an arm 169 by means of a pin 170. The section of the arm 169 which is disposed above the block 158 is provided with a depending finger 171 which bears upon the upper face of the block 158 and the opposite end is provided with a laterally projecting portion 172 having a vertically tapped bore. Engaging said vertically tapped bore is an adjusting screw 173 having a lock nut 174. The lower face of the screw 173 bears against the upper face of a vertically movable plunger 175 of a micro-switch 176. The switch 176, which is normally closed, is connected in series with a relay solenoid 176a to a suitable source of current, the relay contacts being in open position when the solenoid is unenergized. Furthermore, the machine drive motor 176b is connected to a suitable source of current through the relay contacts.

The other end of the arm 169 opposite to the switch end is provided with an adjustable vertical screw 165 which projects into the aperture 95. Therefore, any sufficient buckling of the wire W as it passes under the screw 165 will actuate the arm 169 to open the switch 176 and stop the motor 176b. Thus, upon opening of the switch 176 by depression of the plunger 175, the current to the motor driving the machine is cut off, thereby preventing any damage thereto.

A staple guide rail 177 of rectangular cross-section and of a width substantially equal to the inner width of the shaped staples is supported at one end by the shelf 104 so that its upper face is coplanar with the upper face of the mandrel 100. The leading face of the mandrel 100 abuts the trailing face of the rail 177 thereby providing a continuous track for the staples.

An applicator device 180, for applying an adhesive or other suitable cohering substance to the staples to form a continuous strip thereof, is disposed above and in registry with the guide rail 177 just forward of its trailing edge. The applicator device 180 includes a top plate 181 having a circular well 182 formed in its top face to which is connected a reservoir of a cohering substance. A vertical bore 183 and two laterally extending inclined bores 184 extend from the well 182 through the bottom of the plate 181. A pair of laterally spaced blocks 186 are mounted on the bottom face of the plate 181 by means of screws passing through openings 187 in the blocks 186 and engaging tapped bores 188 in the plate 181. Each of the blocks 186 is provided with an inwardly extending lower flange 189, the confronting edges of the flange 189 being separated a distance somewhat greater than the width of the guide rail 177. Two pair of vertically aligned bores 190 are formed in the plate 181 and blocks 186 by which the applicator device 180 is vertically and slidably supported above the guide rail 177 by means of a pair of suitably mounted vertical pins 191 which engage the bores 190.

An upper wiper plate is formed of a strip 192 and rests in a longitudinal groove 194 formed in the bottom face of the plate 181, and secured therein by screws passing through openings 195 and engaging corresponding tapped bores in the plate 181. A laterally extending groove 196 is formed in the top face of the strip 192 and communicates by means of bores 197 with a pair of longitudinal grooves 198 formed in the bottom face of the strip 192. Furthermore, the groove 196 communicates with the well 182 by way of the bore 183.

A pair of wiper support arms 200 having arcuate leading ends are disposed between the bottom face of the plate 181 and the top faces of the ledges or flanges 189. The arms 200 rest on the flanges 189 and are pivoted at their front by means of pins, not shown, depending from the plate 181 and engaging the apertures 201 adjacent the leading ends of the arms 200. Projecting rearwardly from the lower free ends of the arms 200 are fingers 202. A strip-like wiper element 203 is fastened to the inner face of each of the arms 200 by means of screws passing through countersunk transverse holes 204 in the arms 200 and engaging corresponding tapped bores in the wiper elements 203. The wiper elements 203 have longitudinal grooves 206 formed in their inner free faces, which grooves 206 communicate by means of transverse bores 207 with L-shaped bores 208 in the arms 200. Furthermore, the L-shaped bores 208 extend from the inner faces of the arms 200 to the top face thereof and communicate by way of the inclined bores 184 with the well 182 and the adhesive material reservoir.

Disposed in laterally extending bores in the blocks 186 and bearing against the confronting faces of the arms 200 are compression springs 209 which urge the free ends of the arms 200 inwardly about their pivoted ends. It should be noted that the guide rail 177 passes through the groove defined by the wiper elements 192 and 193, the wiper elements contacting the staples transported along the guide rail 177 and depositing the adhesive thereon. The guide rail 177 extends for a distance beyond the adhesive applying device 180 sufficient to permit the drying of the adhesive and the cohering of the staples into a strip. This distance is determined principally by the drying qualities of the adhesive, the amount applied and the ambient conditions.

The guide rail 177 terminates at a quantitative cut-off unit which includes an electrical solenoid 210 having vertically slidably supported above its upper end by means of arms 211, an armature 212 formed of a suitable magnetic material. The solenoid 210 is positioned between the discharge end of the guide rail 177 and an upright bracket 213 to the upper end of which is pivoted an arm 214 by means of a pin 216. The arm 214 is vertically swingable and is pin connected to a link 217, which, in turn, is pin connected to the armature 212. The free end of the pivoted arm 214 slidably registers with a slot 220 formed between two arms 221 which form the upper part of a bracket member disposed adjacent the terminus of the guide rail 177. Positioned in a vertical bore 223 is a helical compression spring 224 which bears against the bottom face of the free end of the arm 214 urging the arm upwardly. The movement of the arm 214 is limited by a pin supported between the upper ends of the arms 221 and the bottom of the groove 220.

A leg 226 depends from the arm 214 at and to a point above the front edge of the guide rail 177 and has horizontally projecting from its lower end a flange 227. A cut-off arm 228 is suitably supported from the bottom face of the flange 227 and extends in the direction of advance of the staples along the guide rail 177. Furthermore, the bottom face of the arm 228 is flat and horizontal, and when the solenoid 210 is unenergized, the bottom face is normally supported above the forward extension of the upper surface of the guide rail 177 by a distance slightly greater than the thickness of the staple wire. Moreover, the trailing end face of the cut-off arm 228 is slightly in advance of the leading edge of the guide rail 177 by a distance less than the thickness of the staple wire.

An upright bracket 230 is positioned beyond and to one side of the extension of the cut-off arm 228 and is provided with a pair of spaced legs 232 having tapped axial bores which engage oppositely disposed adjusting screws 233. Supported between the adjusting screws 233 is a suitable normally open electric switch 235, such as a micro-switch, which has a depending outwardly sprung actuating arm 234 the lower end of which extends below the cut-off arm 228 and in advance thereof. The switch 235 and the depending actuating arm 234 is adjustable along the direction of advance of the staples in order to control the length of the strips of staples cut off. Moreover, the solenoid 210 is connected through the switch 235 to a suitable source of current so upon closing of the switch by the forward end of a staple strip urging the actuating arm forward, the solenoid is energized. The armature is thus urged toward the solenoid bringing the arm 214 and the connected cut-off arm 228 downwardly severing a measured strip of the staples. The severed strip drops, permitting the return of the actuating arm 234 and the opening of the switch 235. This results in the de-energizing of the solenoid and the upward return of the armature 212, arm 214 and cut-off arm 228 as a consequence of the urging of the helical compression spring 224.

The improved staple fabricating machine described above operates as follows: Wire W is drawn from a reel or other suitable source through the wire straightening and burnishing section of the machine and fed to the staple forming section by the feed rolls 77 and 83 which engage the wire W in the bite between the confronting semi-circular grooves 78. The grooves 78, being of semi-circular shape, the wire W as it is advanced by the feed rolls 77 and 83 is subjected to a minimum of distortion. The peripheral speed of the rolls 77 and 83, and hence the rate of advance of the wire W, is determined by the ratio of the worm and gears 73 and 74, the diameter of the rolls 77 and 83 and the speed of the drive shaft 26. The aforesaid diameters are such that the wire is advanced and fed during each revolution of the shaft 26 an amount equal to the length of the wire in each staple.

The burnishing and straightening device 32 is rapidly rotated at the speed of the main drive shaft through the gears 28 and 30. The wire W is drawn through the bore 46 in the trunnion 33 and between the wipers 49 where any loose foreign matter is efficiently removed. Thereafter, the wire travels along the grooves 44 in the rotating guide and burnishing elements 43 which cause the wire to traverse a helical path whose diameter increases and decreases by successively smaller amounts as the wire advances from the feed end toward the discharge end of the device. This undulating motion of progressively decreasing amplitude imparted to the wire straightens the wire W. Furthermore, as the wire travels along the grooves 44 in the rotating guide elements 43, it is highly burnished. The straightened and burnished wire W then travels through the bore 46 in the trunnion 34 and through the discharge nozzle 53 into the bite of the feed rolls 77 and 83.

Following the feed rolls 77 and 83, the wire W is fed along the grooves 91 and 92 in the block 89 and cut-off block 92 over the cut-off edge of the tip 94, and over the working surface of the tip 102 of the mandrel 101. The operation of the yoke 107 is so timed by the angular position of the cooperating cam 112 that the pad 114 is in its depressed position upon the wire W being advanced an amount beyond the cut-off edge of the insert 94 substantially equal to the length of wire forming the finished staple. The wire W is thus tightly engaged between the confronting surfaces of the pad 114 and the mandrel tip 102. It should be noted that the pressure to which the wire W is subjected by the pad 114 may be controlled by adjusting the eccentrically supported pivot pin 108, thereby minimizing the distortion imparted to the wire W by the clamping action of the pad 114 and mandrel 101. Immediately following the engagement of the wire W between the pad 114 and the mandrel tip 102, the work stroke of the shaping element 144 and the shaping and cutting element 149 commences. The starting of the work stroke is characterized by the elements 144 and 149 coming into contact with the wire W and the stroke continues as these elements are carried downwardly. The cutting edge of the element 149 in cooperation with the confronting upper edge of the insert 94 severs the wire W into the required length and as the elements 144 and 149 continue their downward stroke, the legs of the wire W overhanging the side edges of the mandrel insert 102 are bent downwardly against the vertical sides of the mandrel 100. The wire W, as it is bent to form the legs of the staple, rolls along the wire contacting cylindrical surfaces of the elements 144 and 149 for approximately 90°. It should be noted that the wire W may be continuously and uninterruptedly fed since immediately following the wire severing operation the surface 151 is disposed in the path of the wire W and is of such slope and advanced at such a rate that its intersection with the path traversed by the wire W is always ahead of the leading edge of the wire W and thus does not impede its advance.

The staple S, having been formed, the pad 114 is raised disengaging the staple S and permitting the staple bridge portion B to straighten from the clamped curved shape as a result of the resiliency of the wire W and assume the form illustrated in Figure 8a. During the work stroke, the pusher element 132 is advanced along the mandrel 100 toward the formed staple by the cam 129 acting through the bushing 128 and yoke 120. The staple S is engaged by the front face of the pusher element 132 after the termination of the work stroke and the disengagement of the staple by the pad 114. The pusher element 132 continues to move forward advancing the staple S along the mandrel 100, pushing it against the cammed surface of the detent 164 causing the finger 163 to rise against the pressure of the spring 167. After the staple S has been pushed beyond the detent 165 and the row of formed staples advanced by the thickness of the introduced staple, the pusher element is retracted to its fully withdrawn position permitting the periodic recurrence of the cycle above described. As the pusher element is retracted, the finger 163 is allowed to return to its depressed position, the detent 165 bearing against the mandrel 100 and restricting the backward movement of the staple S.

The staples S are periodically advanced by the pusher element 132 and travel along the mandrel 100 to and along the guide rail 177. As the staples travel along the feed end of the guide rail 177, they pass through the adhesive applying device 180, where they are engaged by the wiper elements 182 and 203, and receive a coating of a suitable adhesive or cohering substance. Upon emergence from the adhesive applying device 180, the staples S travel along the guide rail 177, which is long enough to permit the drying of the adhesive and the forming of the staples S into a continuous cohered strip.

The cohered strip of staples S advance beyond the terminus of the guide rail 177 and are self-supporting, extending in cantilever fashion below the cut-off bar 228. As the strip of staple S advances, the front staple bears against the finger 234 causing the switch 235 to close when the staple strip has reached a predetermined length beyond the terminus of the guide rail 177. The closing of the switch 235 results in the energizing of the solenoid 210 causing the downward movement of the armature 212, arm 214 and cut-off bar 228. The measured cantilevered portion of the staple strip beyond the terminus of the guide rail 177 is severed by the cut-off bar 228 at the registering cut-off edges of the bar 228 and guide rail 177. The severed staple strips, which are uniformly of predetermined length, drop into a suitable storage or transport device, the finger 234 being disengaged and permitted to return to its normal position, which results in the opening of the switch 235 and the de-energizing of the solenoid 210. The arm 214 is urged upwardly by the spring 224 and carries the cutoff bar 228 out of the path of the advancing staple strip and the cycle is periodically repeated.

In the event that for any reason whatsoever the advance of the wire W or the staples S is impeded by jamming or otherwise, the machine is automatically stopped. The jammed staples will eventually pile up under the latch 163 or block 158 and be forced upwardly against said latch and block by the reciprocating pusher element 132. This will result in a rising of the block 158, which, when the pressure of the staples S is excessive, is sufficient to trip the finely adjusted switch 175 through the arm 169, screw 173 and plunger 175. Furthermore, the jammed wire W will buckle through the aperture 95 and bear against the screw 165 urging it upwardly. This will cause a rotation of the arm 169 and will likewise result in actuation of the switch 175. The tripping of the switch 175 results in the stopping of the machine, as above set forth, preventing any damage to the machine and permitting the timely correction of any faults.

The machine is completely adjustable permitting the fabrication of staples to the closest tolerances in spite of a wide variation in the dimensions of the wire stock employed. The stability of the position of the tool holders 134 and 136 relative to the mandrel 100 is insured by the threaded thrust collars 139 which bear against and controllably preload the bearings 24. The cutting elements 144 and 149 are adjustable relative to the mandrel 100 by virtue of their eccentric shanks 146 and 152 respectively, which are engaged by the corresponding radial bores in the tool holders 134 and 136. Thus, variations in the diameter of the wire stock may be compensated for by suitably adjusting the shaping elements 144 and 149 by rotation about their shanks, so that the proper spacing between the surfaces of the elements 144 and 149 and the mandrel 100 is achieved thereby reducing the distortion of the wire W during the shaping of the staple. The wire distortion may be further reduced by adjusting the spacing between the confronting faces of the pad 114 when in depressed position and the mandrel 100. This is accomplished by suitable adjustment of the eccentrically supported pin 108 by which the yoke 107 is pivoted to the bracket 109.

While there has been described and illustrated a preferred embodiment of the present invention, it is obvious that numerous omissions and alterations may be made without departing from the spirit thereof.

I claim:

1. A machine of the character described comprising a longitudinally extending rotatable shaft, means driven in synchronism with said shaft for continuously feeding wire along a longitudinal path transversely spaced from said shaft, a cutting element disposed along said path, a mandrel disposed along said path and longitudinally spaced from said cutting element, a cutting and shaping tool mounted on and extending transversely from said shaft and rotatable therewith along a circular path between said cutting element and said mandrel, said cutting and shaping tool having a cutting edge periodically engaging said cutting element and being defined by the intersection of a leading surface facing the direction of movement of said cutting and shaping tool and a trailing surface facing opposite to the direction of movement of said cutting and shaping tool and extending from said cutting edge obliquely to and in the direction of advance of said wire, a shaping tool mounted on and extending transversely from said shaft and longitudinally spaced from said cutting and shaping tool and rotatable with said shaft along a circular path passing substantially along the side of said mandrel opposite to the path traversed by said cutting and shaping tool, a pusher member having a staple engaging face radially outwardly directed relative to said shaft and movable along said mandrel in a direction transverse to said wire path and actuated by said shaft in synchronism with the movement of said tools.

2. A machine of the character described, comprising a longitudinally extending rotatable shaft, means driven in synchronism with said shaft for continuously feeding wire along a longitudinal path transversely spaced from said shaft, a cutting element disposed along said path, a mandrel disposed along said path and longitudinally spaced from said cutting element, a cutting and shaping tool mounted on and extending transversely from said shaft and rotatable therewith along a circular path between said cutting element and said mandrel, said cutting and shaping tool having a cutting edge periodically engaging said cutting element and being defined by the intersection of a leading surface facing the direction of movement of said cutting and shaping tool and a trailing surface facing opposite to the direction of movement of said cutting and shaping tool and extending from said cutting edge obliquely to and in the direction of advance of said wire, a shaping tool mounted on and extending from said shaft and longitudinally spaced from said cutting and shaping tool and rotatable with said shaft along a circular path passing substantially along the side of said mandrel opposite to the path traversed by said cutting and shaping tool, a pusher member slidable along said mandrel and having a staple engaging face directed radially outwardly relative to said shaft and means including an eccentric element mounted on said shaft between said cutting and shaping tool and said shaping tool for periodically reciprocating said pusher member in synchronism with the movement of said tools.

3. A machine in accordance with claim 2, wherein said mandrel has an upper working surface and including a pad member having a lower face confronting said mandrel working surface and movable between advanced and retracted positions relative to said working surface and eccentric means mounted on said pad to periodically reciprocate said pad.

4. A machine in accordance with claim 3, wherein said eccentric means is mounted on said shaft longitudinally between said tools.

5. A machine in accordance with claim 3, wherein said pad is in its advanced position substantially concurrently with said tools passing into engagement with said mandrel.

6. A machine in accordance with claim 3, wherein said lower surface of said pad has a groove formed therein and including a finger member having a portion registering with said groove and means urging said finger toward said mandrel upper working surface.

7. A machine in accordance with claim 2, wherein the upper working surface of said mandrel is of cylindrical concave configuration and the confronting face of said pad is of corresponding cylindrical convex configuration.

8. A machine in accordance with claim 2, wherein said pusher member is of channel shaped configuration and straddles said mandrel.

9. A machine in accordance with claim 2, wherein the leading faces of said tools are of curved cylindrical configuration.

10. A machine in accordance with claim 2, wherein the trailing face of said cutting and shaping tool is substantially planar.

11. A machine in accordance with claim 2, including a pair of tool holders mounted on and longitudinally spaced along said shaft and engaging and adjustably holding said cutting and shaping tool and said shaping tool respectively.

12. A machine in accordance with claim 2, including a pair of tool holders mounted on said shaft and having transversely extending tool engaging bores and said cutting and shaping tool and said cutting tool are provided with rearwardly projecting cylindrical shanks parallel and eccentric to the longitudinal axes of said respective tools and registering with said corresponding tool engaging bores.

13. A machine in accordance with claim 2, including a transversely extending staple guide in alignment with and extending from said mandrel.

References Cited in the file of this patent

UNITED STATES PATENTS

| Number | Name | Date |
|---|---|---|
| 287,087 | Bayles | Oct. 23, 1883 |
| 306,537 | Sheesley | Oct. 14, 1884 |
| 707,006 | Pross | Aug. 12, 1902 |
| 1,169,698 | Von Vass | Jan. 25, 1916 |
| 1,212,437 | Bates | Jan. 16, 1917 |
| 1,244,448 | Berg | Oct. 23, 1917 |
| 1,342,712 | Garllus & Knott | June 8, 1920 |
| 1,375,924 | McDonald | Apr. 26, 1921 |
| 1,637,824 | Hidzick | Aug. 2, 1927 |
| 1,675,426 | Ross | July 3, 1928 |
| 2,043,246 | Hawkes | June 9, 1936 |
| 2,059,368 | Kruttschmitt | Nov. 3, 1936 |
| 2,082,882 | Garnero | June 8, 1937 |
| 2,149,430 | Fleming | Mar. 7, 1939 |
| 2,245,732 | Stull | June 17, 1941 |
| 2,286,956 | Dillon | June 16, 1942 |
| 2,511,769 | Chamberlain | June 13, 1950 |

FOREIGN PATENTS

| Number | Country | Date |
|---|---|---|
| 357,758 | Great Britain | Oct. 1, 1931 |